United States

Shajenko

[11] 3,903,483
[45] Sept. 2, 1975

[54] DYE LASER FOR HOLOGRAPHIC APPLICATIONS

[75] Inventor: Peter Shajenko, Marlborough, Conn.

[73] Assignee: The United States of America as represented by the Secretary of the Navy, Washington, D.C.

[22] Filed: Jan. 7, 1974

[21] Appl. No.: 430,953

[52] U.S. Cl. ............................. 331/94.5 L; 350/3.5
[51] Int. Cl.² ........................................... H01S 3/20
[58] Field of Search...................... 331/94.5; 350/3.5

[56] References Cited
UNITED STATES PATENTS
3,753,146  8/1973  Reynolds et al................ 331/94.5 L

*Primary Examiner*—William L. Sikes
*Attorney, Agent, or Firm*—Richard S. Sciascia; Arthur A. McGill; Prithvi C. Lall

[57] ABSTRACT

A dye laser for holographic applications is described wherein a Q-switched ruby laser is used to pump the dye laser using Rhodamine-6G as the dye. The dye laser is pumped with a Q-switched ruby laser having its 6,943 A output beam frequency-doubled with a KDP crystal. The light beam of 3,472 A so obtained is applied to pump the dye laser in a longitudinal arrangement using a dispersing prism. The resultant tunable dye laser output is then applied for recording holograms. Multi-stage systems and cascade spectrum narrowing of the dye laser output are used to increase the overall efficiency for holographic applications.

11 Claims, 3 Drawing Figures

DYE LASER FOR HOLOGRAPHIC APPLICATIONS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is related to the use of dye lasers for holographic applications and more particularly to a dye laser which is pumped by a Q-switched ruby laser.

The efficient luminescence exhibited by many organic compounds makes their use as laser materials attractive and this possibility was considered early in laser research. However, initial experiments produced disappointing results. Within the past few years the production of coherent visible radiation by organic dyes in solutions has been demonstrated, and the device based upon this phenomenon is called a dye laser. One of the most attractive properties of a dye laser is its tunability, i.e., its ability of being wavelength tunable across wide spectrum (approximately 2,000 A to 11,000 A). Furthermore, the number of fluorescent dyes is very large and compounds may be selected for emission in any given region of the optical spectrum. The dye laser is thus the first truly tunable laser which operates throughout the visible spectrum. Furthermore, a dye laser has many advantages as compared to solid state and gas lasers. As an example, the use of a liquid active medium simplifies the problem of obtaining high power output and high efficiency and facilitates cooling of the laser for operation at high power levels and at high pulse repetition rates. It also reduces the cost of the lasing medium used as organic dyes are inexpensive, only a small fraction of the cost of materials such as ruby crystals.

Dye lasers are pumped by the absorption of light. The existence of a metastable triplet state in a lasing medium such as an organic dye, is detrimental to the selection of pumping light sources. To eliminate triplet state losses, the pumping light pulse should be of short duration. Therefore, Q-switched ruby lasers, nitrogen gas lasers and short-pulse duration flash lamps are used for pumping dye lasers. Low power output of nitrogen-gas lasers limits their application for pumping dye lasers. Flash lamp pumping of dye lasers has been most commonly used. However, thermal effects produced by the flash lamp makes a dye laser output unsuitable for highly coherent operation in holographic applications. Furthermore, excessive jitter of pulsed output of a dye laser using a flash lamp source forbids precise pulse timing. This leaves pumping dye lasers by Q-switched ruby laser very desirable as it minimizes or eliminates above-mentioned problems.

A Q-switched ruby laser can be used to pump a dye laser using Rhodamine-6G as the lasing medium wherein the output of the Q-switched ruby laser is frequency-doubled by using a medium, such as KDP crystals, exhibiting non-linear optical effect in order to bring the output of the dye laser within the visible part of the spectrum. The drawbacks of using a Q-switched ruby laser for pumping a dye laser are the high cost involved and the low efficiency of operation. Furthermore, comparatively wide spectrum of a dye laser output hampered practical development. Consequently, use of a Q-switched ruby laser for pumping of dye lasers has not found practical applications in the past.

SUMMARY OF THE INVENTION

The objects and advantages of the present invention are accomplished by using a Q-switched ruby laser in conjunction with a medium, such as Potassium Dihydrogen Phosphate ($KH_2PO_4$) crystals, hereinafter called as KDP crystals, exhibiting nonlinear optical properties and a dispersing device such as a prism. A system for using a Q-switched ruby laser for pumping a dye laser thus comprises a Q-switched ruby laser, a KDP crystal, a dispersing device such as a prism, a cell for containing the organic dye used as a lasing medium and a resonant cavity including an echelle grating and a Fabry-Perot etalon as reflectors. The output of the Q-switched ruby laser having wavelength 6,943 A is frequency-doubled by the KDP crystal and giving rise to two beams of wavelengths 6,943 A and 3,472 A which are dispersed by the prism. The beam of light of wavelength 3,472 A is used for pumping the dye laser which gives a single mode dye laser pulsed output. The beam of light of wavelength 6,943 A is directed from the prism into a second KDP crystal and the frequency-doubled beam of light of wavelength 3,472 A so obtained is used by means of a combination of mirrors to pump the dye laser again, resulting in a second dye laser output pulse. The timing between the two output pulses of the dye laser can be precisely controlled by varying the distances between the prism, mirrors of the mirror combination and the dye cell. This arrangement is applicable to double-pulsed holographic interferometry. The same process can be repeated for multiple pulsed and/or multiple wavelength operations and cascade spectrum narrowing of a dye laser by using either dye cells which are coupled to act like an oscillator or amplifier having only one echelle grating/Fabry-Perot etalon combination for tuning or an oscillator having two dye cells with their respective tuning cavities of echelle grating/Fabry-Perot etalon combinations.

One object of this invention is to obtain a multipulsed high power coherent light output of dye lasers.

Another object of this invention is to obtain a multi-wavelength high power coherent output of dye laser.

Still another object of this invention is to permit cascade operation of dye lasers for spectrum narrowing and improved efficiency.

Still another object of this invention is to provide an efficient and simple way for obtaining multipulsed and/or multi-wavelength output of dye lasers with easily variable time delay between pulses for pulsed laser applications including double pulsed holographic interferometry, holographic contouring, meteorology, and selective interaction of light with matter.

Still another object of this invention is to provide a dye laser having high power output and high efficiency.

Still another object of this invention is to eliminate problems associated with generated heat in case of pulsed lasers operating at high power level and high repetition rate.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
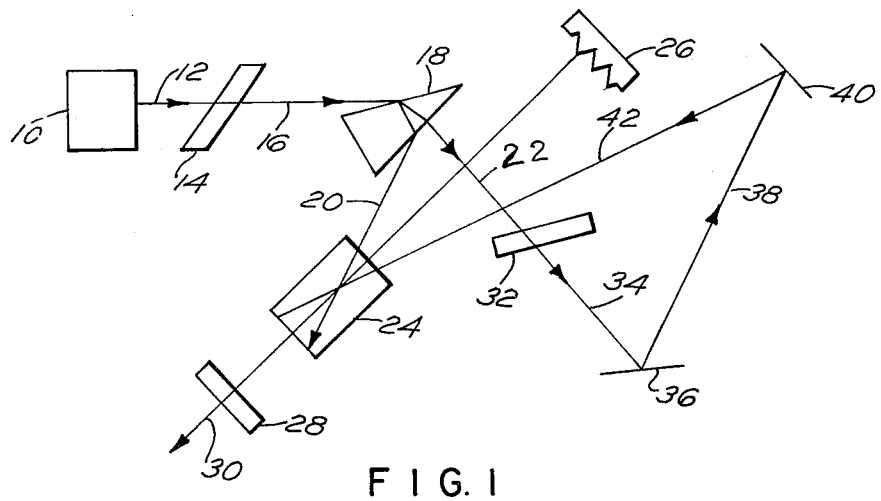
FIG. 1 shows a block diagram of one embodiment of a dye laser according to the teachings of the subject invention.

Referring to the drawings wherein like reference characters designate like parts throughout, and more particularly to FIG. 1 thereof, a block diagram of a dye laser setup of one of the embodiments of the subject invention is shown. Block 10 in FIG. 1 represents a Q-switched ruby laser which is preferably selected for pumping the dye laser because of its high power capability, its narrow pulse, and its output in the visible part of the spectrum. The ruby laser used was made by Korad Corporation. However, any other similar unit can be used without deviating from the teachings of this invention. For Q-switching of the ruby laser, a Pockels cell was employed because of its negligible (less than 10 nanoseconds, i.e., $< 10 \times 10^{-9}$ sec.) pulse-jitter characteristics. It should be noted that Q-switching of the ruby laser can also be accomplished by using rotating mirrors which require a very precise rotational speed control. Furthermore, for single pulse operation, Q-switching with a bleachable dye can also be used. The output beam 12 of the Q-switched ruby laser 10 has a wavelength of 6,943 A which lies in the red of the spectrum. Beam 12 is frequency-doubled using a KDP crystal so as to obtain light beam of wavelength 3,472 A. It should be noted that the object of the frequency-doubling the Q-switched ruby laser beam is to obtain a beam of light of short enough wavelength to excite the dye laser output in the visible part of the spectrum. Although the technique of frequency-doubling is fairly well developed, a lack of reliability of operation imposes a considerable problem in the development of a setup for holographic applications. Since a KDP crystal is hygroscopic, it has to be protected from the atmosphere by using a crystal housing which imposes a problem due to the heat and high power encountered in operation. It is preferred to use a KDP crystal made by either Lasermetrics Company or Isomet Company and having dimensions 12.5 × 12.5 × 25 mm, cut to a normal index-matching angle of 50° 35', and enclosed in an aluminum cylindrical container with Brewster windows installed at each end. The input window is preferably set for a horizontally polarized fundamental beam and the output window is preferably set for a vertically polarized second harmonic. Rearrangement of windows will be necessary if other fundamental beam polarization are used. Because the beam intensity is sufficient to vaporize the container wall material, and thus settle on the crystal surface, a quartz diffuser is inserted in the container in the output end to diffuse the fundamental laser beam reflected from the output window. The crystal is cemented in the container with epoxy along its four edges. Since low heat conductivity of epoxy caused the power output to decrease gradually, it is found necessary to maintain the room temperature preferably below 65°F in order to keep the dye laser output constant. It is also possible to mount the KDP crystal 14 on a heat sink having temperature control. The KDP crystal is set in a gimbal suspension mount that provided precise alignment of the crystal through two angular motions, each with a resolution of 1 second of arc. One angular motion is for index-matching alignment and the other for azimuthal alignment. Spurious vibrations are found to be of little concern as the known micrometer settings of the crystal mount after optical alignment are sufficient to bring the crystal into the index-matching position. Consequently the frequency-doubling operation is made fairly reliable.

Beam 16 of radiant energy emerging out of the KDP crystal 14 comprises components of wavelength 6,943 A (about 93 percent) and 3,472 A (about 7 percent). Beam 16 of radiant energy is then allowed to fall on a dispersing prism 18 where the two beam components of different wavelengths are separated, i.e., beam 20 representing the beam component of wavelength 3,472 A and beam 22 of beam component having wavelength 6,943 A. The dispersing prism 18 is preferably manufactured by Lambert Corporation. It permits construction of the dye laser cavity along the excitation beam as closely as possible and thus permits longitudinal excitation of the dye laser with only a small angular displacement between the excitation and dye laser beams. Furthermore, it separates the ruby laser beam component 22 of wavelength 6,943 A from the dye excitation beam component 20 of wavelength 3,472 A and thus allows maximum utilization of the available ultra-violet light for the dye excitation by eliminating the need for an ultra-violet filter. Furthermore, positioning of the dispersing prism 18 at the Brewster angle further minimizes reflection and thereby minimizes excitation beam losses. Beam 20 is then allowed to excite dye laser 24, preferably a cylindrical cell having an internal diameter of 30 mm and length of 42mm. The cell is fitted with Brewster angle windows at each end to prevent lasing by reflection between cell windows and to reduce reflection losses. To prevent contamination of the dye solution, cell 24 is preferably made of Teflon and Teflon O-rings are used for sealing the silica windows. Since the cell is closed during operation, it is constructed to contain a large volume of dye solution, preferably, 29.7 ml, to minimize thermal effects. Cell 24 is preferably located halfway between two reflectors preferably of 53-cm-long laser cavity and is positioned for vertically polarized excitation and lasing pulses. Selection of a dye to be used in dye cell 24 depends upon its output spectrum, its fluorescence quantum efficiency which is defined as the ratio of the number of lased photons to the number of excitation photons, no triplet formation and no absorption of the fluorescence by the dye in its lowest excited singlet state. From the many dyes available, Rhodamine-6G is selected because of the high quantum efficiency (83 percent in alcoholic solutions). Because of the narrow excitation pulse from a Q-switched ruby laser having pulse width of 30 nanoseconds (30 × 10⁻⁹ seconds) employed, triplet formation is negligible. Furthermore, the overlap of absorption and fluorescence spectra at the lasing frequency is negligible. However, it should be clearly understood that other dyes can easily replace Rhodamine-6G for operation in the other regions of the light spectrum without deviating from the teachings of this invention. The dye concentration is preferably estimated from the threshold condition for laser oscillation. The optimum molar dye concentration in this embodiment was found to be $1.9 \times 10^{-4}$ moles of Rhodamine-6G which has a molecular weight of 479.02. At this concentration the threshold voltage is minimal and the dye laser produces maximum power output at a constant excitation.

Tuning and spectrum narrowing of the radiant energy output of the dye laser 24 is accomplished by using an echelle grating 26 and a Fabry-Perot etalon 28. Since a dye laser can be tuned over a wide spectrum, i.e., the peak of the broad spectrum can be continuously shifted toward a desired wavelength, a dye laser operating in a broad spectrum is not suitable for holographic work where the single $TEM_{oo}$ mode of operation (i.e., the simplest mode of operation, giving rise to a gaussian beam) is employed. The echelle grating 26 is preferably manufactured by Bausch & Lomb Company and preferably has 316 grooves per millimeter, all blazed at 60° 20', and is made to operate in the tenth order and with grooves horizontal for the Littrow mode of operation, i.e., a particular type of grating mounting. The grating 26 is mounted in a rugged holder that can be rotated about a horizontal axis by means of an adjustment screw to provide tuning of the laser output. With the echelle grating 26 mounted in this way, the electric vector of the dye laser beam is generally perpendicular to the grooves and results in a reflectivity of 65 percent in the tenth order. Even though the polarization of the dye laser beam is mainly allowed by the Brewster windows of the dye cell 24, the grating 26 further improves the polarization property of the dye laser beam. The grating can also be rotated about a vertical axis to compensate for any misalignment caused by the tuning procedure. The use of a Fabry-Perot etalon 28 instead of using an output mirror in the laser cavity acts as a reflection filter and further narrows the line width of the dye laser emission. Etalon 28 is preferably a sapphire plate having thickness of 3.1 mm, total reflectivity of 43 percent, and a full aperture of 17 mm. The output beam 30 used for holographic applications in this case was such that the dye laser is preferably tuned to operate at wavelengths 5,690 A and 5,750 A. However, it should be noted that any other wavelength within the fluorescent spectrum of Rhodamine-6G can be selected as desired.

Beam 22 of wavelength 6,943 A is frequency-doubled by using another KDP crystal 32 and the output beam 34 comprises two beam components of wavelengths 6,943 A and 3,472 A. Mirrors 36 and 40 are so adjusted that reflected beam 38 from mirror 36 is reflected again by mirror 40 to form beam 42 which is used to excite the dye cell 24. By changing the position of mirrors 36 and 40, it is possible to get another output pulse or beam of the same frequency and wavelength as beam 30 but separated from beam 30 by a preselected time duration. Thus in this embodiment it is possible to obtain two laser beams from a single dye laser which had the same wavelength and frequency but which are separated from each other by a preselected time duration and which can be used for holographic applications.

Figure 2:
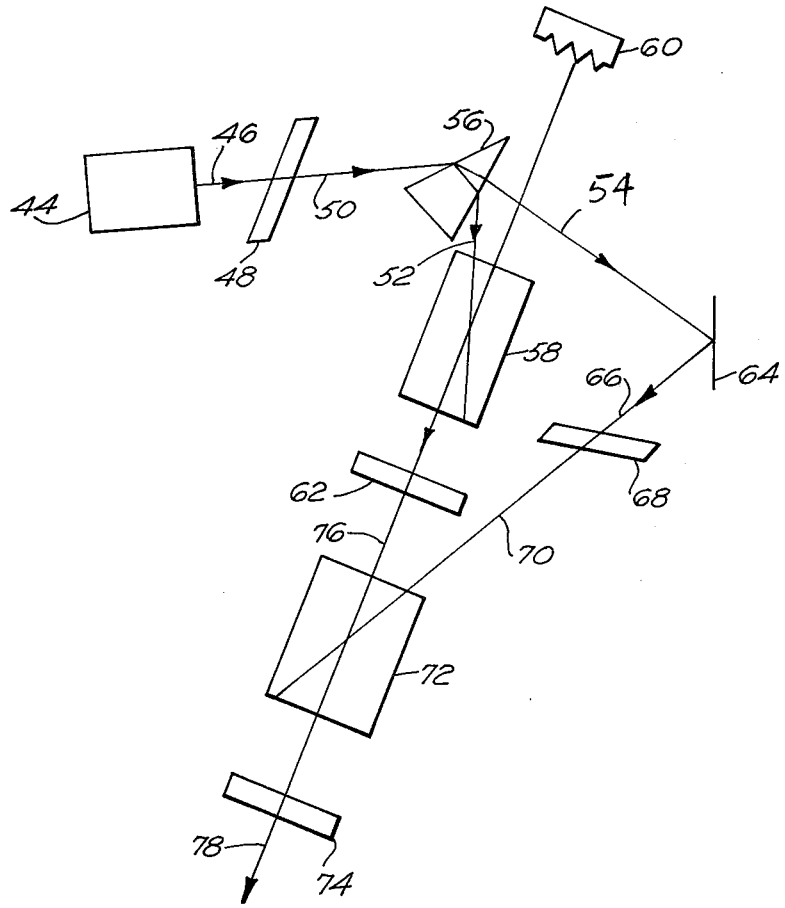
FIG. 2 shows a block diagram of another embodiment of the subject invention.

FIG. 2 represents a second embodiment of this invention wherein a Q-switched ruby dye laser 44 give an output beam 46 having wavelength 6,943 A which is frequency-doubled by KDP crystal 48 to obtain a beam 50 having components of wavelength 6,943 A (93 percent) and 3,472 A (7 percent). Beam 50 is dispersed into beams 52 of wavelength 3,472 A and beam 54 of wavelength 6,943 A by means of a dispersing prism 56. Beam 52 is then used to excite first dye cell 58 which is tuned by a tuning arrangement comprising echelle grating 60 and Fabry-Perot etalon 62. It should be noted that all components such as the Q-switched ruby laser 44, KDP crystal 48, dispersing prism 56, dye cell 58, echelle grating 60 and Fabry-Perot etalon 62 are similar to the corresponding components used in the first embodiment of this invention diagrammatically shown in FIG. 1. The arrangement of this embodiment discussed so far gives an output beam or pulse having wavelengths, preferably either 5,940 A or 5,950 A as in the first embodiment of this invention.

Beam 54 having wavelength 6,943 A is reflected by mirror 64 and the so obtained reflected beam 66 is frequency-doubled by KDP crystal 68 and the output beam 70 of KDP crystal 68 is used to excite another dye cell 72 which uses mirror 74 as a reflector. Output beam 76 of dye cell 58 is passing dye cell 72. Beam 76 couples the outputs of dye cells 58 and 72 and gives rise to a coupled dye laser oscillator having an output beam 78 of a single wavelength which can be used for holographic applications. It should be noted that this arrangement also works as an amplifier if mirror 74 is removed.

Figure 3:
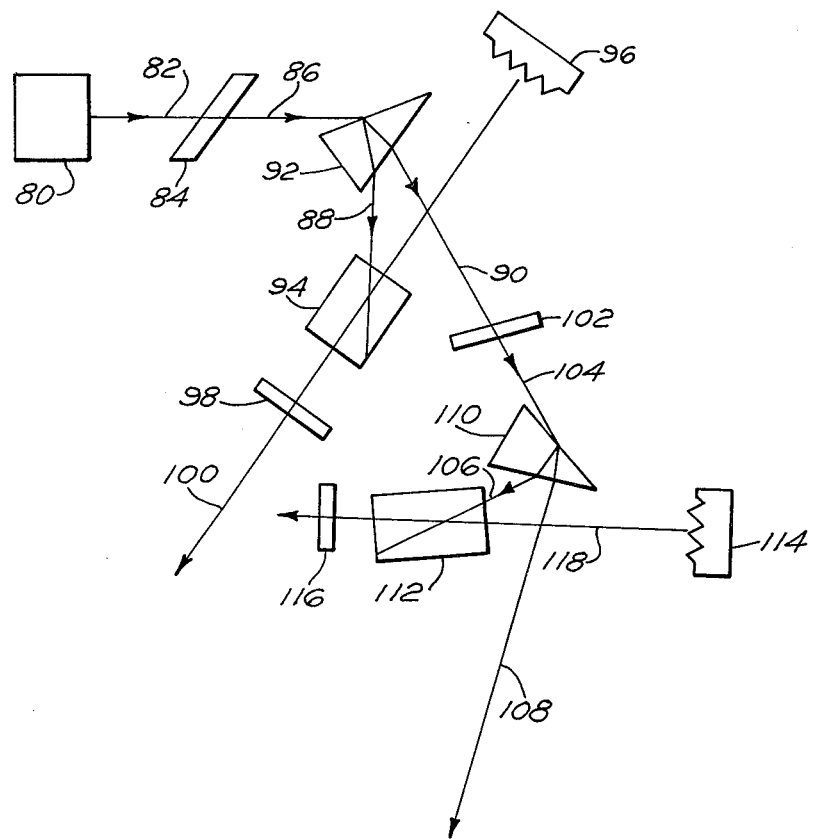
FIG. 3 represents a block diagram of still another embodiment of the subject invention.

FIG. 3 diagrammatically shows the third embodiment of this invention wherein a Q-switched ruby laser 80 produces an output beam 82 of wavelength 6,943 A which is frequency-doubled by KDP crystal 84. The output beam 86 of KDP crystal 84 has two components of wavelengths 6,943 A (93 percent) and 3,472 A (7 percent). Beam 86 is dispersed into beam 88 of wavelength 3,472 A and beam 90 of wavelength 6,943 A by dispersing prism 92. Beam 88 is then used to excite dye cell 94 which uses a tuning arrangement comprising an echelle grating 96 and Fabry-Perot etalon 98 so as to produce an output 100 of one wavelength. Beam 90 is frequency-doubled by means of crystal 102 and the output beam 104 of crystal 102 comprises two components of wavelengths 6,943 A and 3,472 A. Beam 104 is dispersed into beams 106 of wavelength 3,472 A and beam 108 of wavelength 6,943 A by means of dispersing prism 110. Beam 106 is then used to excite another dye cell 112 which uses a tuning arrangement comprising an echelle grating 114 and Fabry-Perot etalon 116 so as to produce an output beam 118 of a different wavelength. By using this arrangement one is able to generate dye laser outputs of two different wavelengths. It should be understood that beam 108 having wavelength 6,943 A can be again frequency-doubled and its component of wavelength 3,472 A can be further used to excite either dye cells 94 and 112 or a different dye cell. This process can be repeated until all the energy of the output beam 82 of Q-switched ruby laser 80 is used up.

Briefly stated, a dye laser for holographic applications using the teachings of this invention comprises a Q-switched ruby laser, the output of which is frequency-doubled by means of a KDP crystal. The output beam of the KDP crystal comprises two components of different wavelengths which are dispersed into two separate beams by a dispersing prism. The beam of the shorter wavelength is then used to excite a dye cell using Rhodamine-6G as the lasing dye and using a tuning arrangement comprising an echelle grating and a Fabry-Perot etalon. The longer wavelength component dispersed by the dispersing prism is frequency-doubled again and the shorter wavelength component thereof is used to excite the same dye cell again by using a group of mirros thus obtaining two output dye laser pulses of the same wavelength but separated from each other by a preselected time. Furthermore, a modified arrangement is used to couple two dye cells so as to form a coupled dye laser oscillator. Another variation of the dye laser is wherein two separate dye cells and their corresponding tuning arrangements are used to generate two-wavelength tunable dye laser outputs.

Obviously many modifications and variations of the present invention are possible in the light of the above teachings. As an example, crystals other than KDP crystals can be used for frequency-doubling the output of a Q-switched ruby laser. Furthermore, a Q-switched ruby laser which is used to excite the dye laser can be replaced by another laser which puts out a narrow pulse. Furthermore, different organic dyes can be used to obtain dye laser output having wavelength in any part of the visible spectrum. Besides, the nature of the tuning arrangement can be varied from the one described in various embodiments of this invention. It should be noted that the basic techniques discussed above, i.e., frequency-doubling of the output of a Q-switched ruby laser, dispersion of the components of the frequency-doubled output beam of a Q-switched ruby laser, excitation of an organic dye in a dye cell, and tuning of the dye cell using a tuning arrangement comprising an echelle grating and a Fabry-Perot etalon; can be combined and cascaded in a number of possible ways to obtain one or more dye laser oscillators and/or amplifiers generating single wavelength or multiple wavelength outputs without deviating from the teachings of this invention. It is therefore understood that within the scope of the appended claims the invention may be practiced otherwise than as specifically described.

I claim:

1. A dye laser system comprising:
   a laser means for providing a relatively narrow beam of radiant energy;
   means for frequency doubling said beam of radiant energy and thus obtaining a component of said beam of radiant energy having the wavelength half the wavelength of said beam of radiant energy;
   dispersion means for separating said component of said beam of radiant energy from the remaining portion of said beam of radiant energy;
   a dye cell adapted to be excited by said component of said beam of radiant energy;
   means for tuning said dye cell; and
   means for successively frequency doubling and using the frequency-doubled components of the remaining portion of said beam of radiant energy for exciting said dye cell.

2. The dye laser system of claim 1 wherein said laser means for providing a relatively narrow beam of radiant energy is a Q-switched ruby laser.

3. The dye laser system of claim 2 wherein said means for frequency doubling includes a KDP crystal.

4. The dye laser system of claim 3 wherein said dispersion means comprises a dispersing prism.

5. The dye laser system of claim 4 wherein said dye cell further includes a generally cylindrical cell adapted to contain an organic dye to be excited by said component of said beam of radiant energy.

6. The dye laser system of claim 5 wherein said organic dye adapted to be enclosed in said generally cylindrical cell is Rhodamine-6G.

7. The dye laser system of claim 6 wherein said generally cylindrical cell is adapted to be fitted with Brewster windows at ends thereof to reduce lasing due to reflection.

8. The dye laser system of claim 7 wherein means for tuning said dye cell comprises an echelle grating and a Fabry-Perot etalon.

9. The dye laser system of claim 8 wherein said means for successively doubling and using the frequency-doubled components of the remaining portion of said beam of radiant energy includes plurality of KDP crystals and a plurality of reflecting mirrors.

10. A dye laser system for holographic applications comprising:
    a laser means for obtaining a relatively narrow beam of radiant energy;
    means for frequency doubling said beam of radiant energy;
    means for separating the frequency-doubled component from the remaining portion of said beam of radiant energy;
    a first dye cell adapted to be excited by said frequency doubled component of said beam of radiant energy;
    means for tuning said first dye cell;
    means for frequency doubling the remaining portion of said beam of radiant energy;
    means for separating the frequency-doubled component of the remaining portion of said beam of radiant energy from the remaining portion thereof;
    a second dye cell adapted to be excited by the frequency-doubled component of the remaining portion of said beam of radiant energy;
    means for tuning said second dye cell; and
    means for coupling said first dye cell and said second dye cell to form a coupled dye laser oscillator.

11. The dye laser system of claim 10 which further includes means for successive frequency doubling, separating, exciting a plurality of dye cells in succession and obtaining a multiple wavelength dye laser oscillators.

* * * * *